United States Patent Office 3,303,716
Patented Feb. 14, 1967

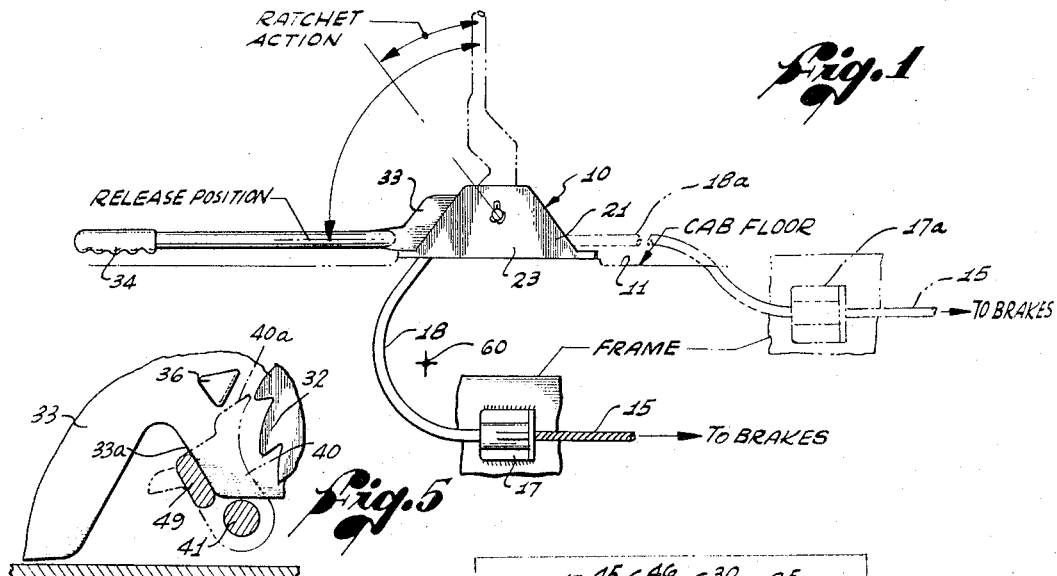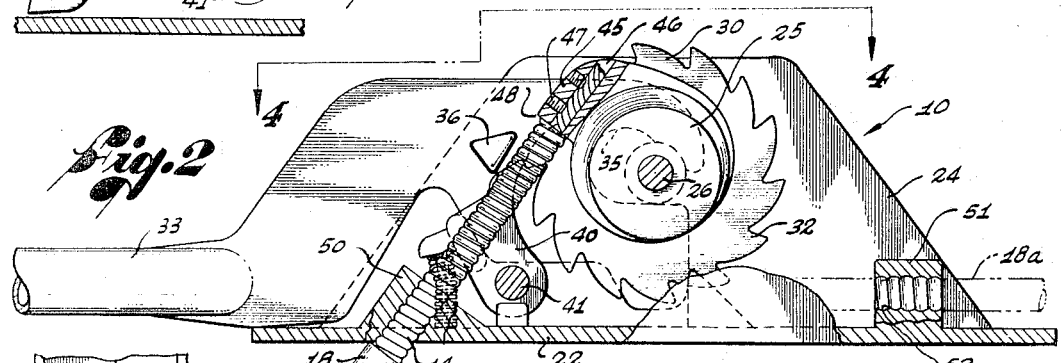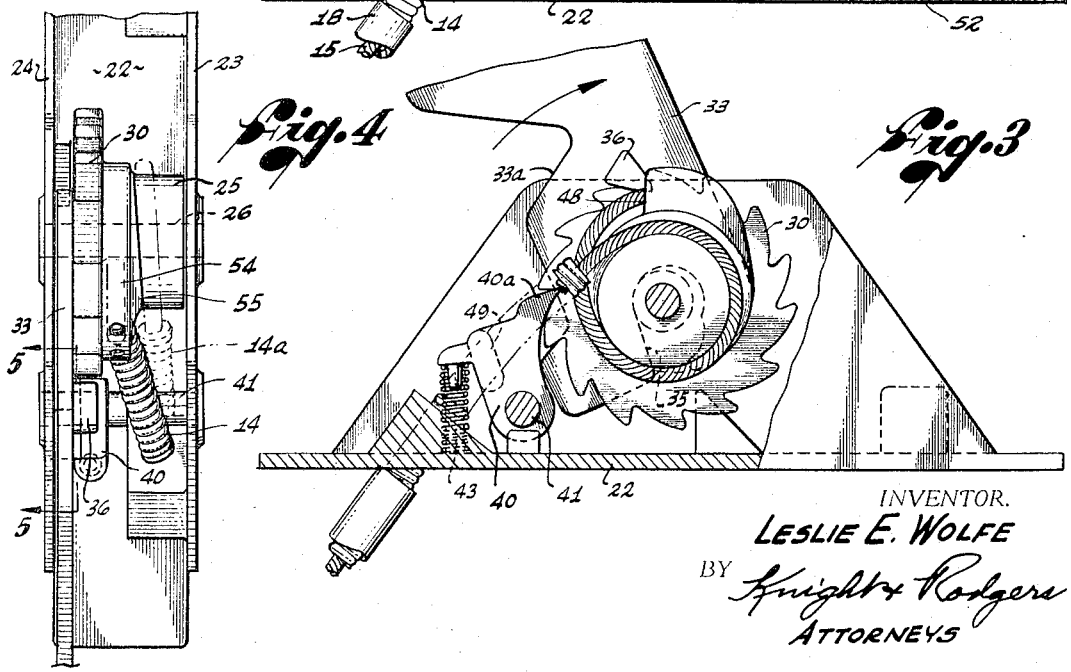

3,303,716
CABLE BRAKE OPERATOR FOR TRUCKS AND THE LIKE
Leslie E. Wolfe, Los Angeles, Calif.
(14646 Hawes St., Whittier, Calif. 90604)
Filed Feb. 15, 1965, Ser. No. 432,641
7 Claims. (Cl. 74—505)

This invention relates generally to cable tensioning means or a cable operator, and more particularly to a cable operator of the type adapted for manual application of the brakes on a vehicle such as a truck, or the like.

A general object of the present invention is to promote safety in the operation of heavy motor trucks by providing effective manually operated brakes of great power which can bring a heavy truck to a stop, even on a grade, in the event of failure of power operated hydraulic or pneumatic brake systems. A brake operator of this general type is shown in my Patent No. 3,077,790, issued February 19, 1963, for "Cable Brake for Trucks"; and the present invention may be regarded as in the nature of an improvement thereon.

In many designs of commercial vehicles or trucks, the cab or the driver's compartment is fixed in position. The cable operator is attached to the cab floor at a position easily accessible to the vehicle operator and the cable then runs directly backward to a position rearward of the cab where it is connected to the brakes in any suitable manner. On the other hand, in many vehicles of relatively modern design, the driver's cab is mounted over the engine and consequently it is pivoted in such a way that it can be swung forward for access to the engine compartment. A design of this type is commonly referred to as a tilt-cab; and in order to adapt the cable operator to a vehicle of this design, the cable departing from the operator generally extends forwardly and downwardly from the operator in order to pass forwardly and then around the pivotal mounting of the cab. Hence, it becomes a general object of the present invention to provide a design of a cable operator which is flexible in installation and use, being equally adapted to either the conventional or the tilt-cab design of vehicle.

In a cable operator of this type, the cable is wound on a drum, rotation of the drum tensioning the cable to apply the brakes. When the drum is released, it spins freely under the pull of the cable and it has sufficient momentum that, if unrestrained, over-travels the desired stopping position. This over-travel can produce a relatively sharp kink in the cable which, when repeated often enough, breaks the individual wires in the cable and therefore weakens it. Since truck drivers customarily and frequently use the manual cable operator as a parking brake or safety brake, and not merely as a brake for emergency stops, the brake is subjected to continual use and it is desirable to take precautions to avoid maltreatment of the equipment or any operation which would tend to weaken the cable.

Thus it becomes another object of the invention to provide a novel form of stop means which prevents the drum from over-travel beyond the desired stopping position, avoiding waer or sharp bends in the cable. In this way the durability of the equipment and the safety afforded by the equipment are both assured.

In order to avoid an unduly large drum on which the cable is wound, it is desirable to provide for wrapping the cable around the drum more than once, perhaps making several turns if necessary in order to take up all the slack in the system and apply the brakes. At the same time, the drum should engage the stop means at the proper time to prevent over-travel and consequently the cooperation between the stop means and the drum is such that one action does not interfere with the other.

Thus it is a further object of the invention to provide a novel cooperation between the stop means and the drum which enables the stop means to become effective at the proper point in the reverse rotation of the drum without having the stop means place any limitation upon forward rotation of the drum.

These objects of the present invention are accomplished by providing cable tensioning mechanism suitable for mounting within the driver's compartment of a vehicle, and comprising a stationary frame; a drum rotatably mounted on the frame; a cable attached at one end to the drum to be wound around the drum and thereby placed under tension; manually operable means to rotate the drum in the forward direction to effect winding of the cable on the drum; releasable detent means engageable with the drum to prevent reverse rotation of the drum and releasable to allow reverse rotation of the drum in order to release the brakes; a flexible housing around the cable adjacent to the drum; and anchor means on the frame adjustably receiving the cable housing in order to connect the cable housing to the frame and to allow the housing to project for a selected distance beyond the anchor means toward the drum, in which position the housing can engage stop means on the drum at the proper point in the reverse rotation of the drum to limit the drum revolution.

Although there may be only one anchor means on the frame, in a preferred embodiment of the invention, there are two anchor blocks at spaced positions, one preferably forwardly and the other rearwardly of the shaft on which the cable is rotatably mounted, but each having an internal bore through which the cable housing passes. In either of the anchor blocks, the housing is properly positioned to be engaged by stop means on the drum. Each bore and the cable housing preferably have inter-engaging thread means whereby the cable housing can be moved axially of the cable with respect to the anchor means by turning the housing in the anchor block in order to adjust the end of the housing to the proper position to engage the drum.

How the above objects and advantages of the present invention, as well as others not specifically mentioned herein, are attained will be better understood by reference to the following description and to the annexed drawing, in which:

FIG. 1 is a side elevation of a cable operator embodying the present invention, showing diagrammatically a typical installation.

FIG. 2 is an enlarged view in vertical section of the brake operationing mechanism, showing the operating lever in released position and with stop means on the drum engaging the end of the brake cable housing.

FIG. 3 is a view similar to FIG. 2 showing the parts in the positions occupied when the manually operated lever is rotating the drum forwardly to tension the cable, the cable being wrapped around the drum for more than one full turn.

FIG. 4 is a top plan view of the cable operator with the parts in the positions shown in FIG. 2.

FIG. 5 is a fragmentary section on line 5—5 of FIG. 4 showing the pawl moved out of restraining position.

In FIG. 1, the operator is shown diagrammatically as installed on a vehicle of the tilt-cab design with alternative arrangement shown in dotted lines. Additional details of the installation of this type are shown in my issued patent, referred to above, to which reference may be made.

Referring to FIG. 1, the operator indicated generally at 10 is shown as installed on the floor 11 of the cab or driver's compartment, and this may be either the floor of the tilt-cab or a stationary portion of the truck chassis.

Heavy motor trucks are customarily provided with brakes which are operated by either hydraulic or pneumatic systems having flexible control lines extending from the driver's cab to power motors which are employed to actuate the brakes. Occasionally the power operated brake systems fail at critical times; and in the interest of safety it is desirable to provide an auxiliary brake system consisting of a manually operated means for setting the brakes, such means being of sufficient strength and power for stopping even a heavy vehicle on a grade. In a truck of the tilting-cab type, this introduces a problem because of the necessity for mounting the brake operator on the cab which is movable with respect to the truck's chassis. Tilt-cab trucks normally employ a pivot or axis for mounting the cab, which is not designed for the transmission of any substantial force between the cab and the chassis. Account must be taken of this design characteristic in order to transmit sufficient force to provide adequate power to operate the brakes. In order to overcome the need for transmittingg any substantial force between the cab and the chassis, the brake mechanism mounted in the cab is provided with a flexible tubular housing 14 which surrounds and encloses the portion of the brake operating cable 15 adjacent the operator 10. One end of housing 14 is fastened to operator 10, as will be discussed later in greater detail, while the other end of the cable housing is mounted to a suitable portion of the frame by means of bracket 17. Bracket 17 may be welded to the frame or attached thereto by other means, such as bolts. The portion of the cable housing between operator 10 and bracket 17 is preferably enclosed in tubular sheath 18 of rubber or a synthetic plastic which is resistant to weathering and also to gasoline and oil with which it may come in contact.

As may be seen better by reference to FIGS. 2 and 4, the brake operating mechanism 10 comprises a U-shaped frame 21 having a baseplate 22 and a pair of generally parallel, upwardly extending sideplates 23 and 24. Frame 21 may be of any suitable construction, that is, it may be a single integral casting or it may be of welded or other assembled construction. A cable drum 25 is rotatably mounted in the frame between sideplates 23 and 24 by shaft 26 which is journaled at its ends in suitable openings in sideplates 23 and 24. Drum 25 is rotated by means of ratchet wheel 30 which is securely fastened to drum 25, preferably being formed integrally therewith. Ratchet wheel 30 has a plurality of ratchet teeth 32 spaced around its periphery.

In order to rotate ratchet wheel 30 and drum 25 to wind cable 15 around the drum, operating lever 33 is provided. Lever 33 has at one end handle 34 by which the vehicle operator may grasp the operating lever to apply the brakes. Operating lever 33 has an elongated opening 35 through which shaft 26 passes in order to provide a fulcrum about which lever 33 is oscillated. As shown in FIG. 4, lever 33 is mounted on shaft 26 adjacent ratchet wheel 30, and is provided with a projecting tooth member 36 on the side adjacent ratchet wheel 30. Tooth 36 is adapted to engage any one of teeth 32 of the ratchet wheel to effect an operating connection between the lever and the ratchet wheel. Thus when the lever is moved in a clockwise direction viewed in FIGS. 1 and 2, tooth 36 engages the end face of one of teeth 32 in order to rotate the ratchet and drum 25 in a first direction which is hereinafter referred to as the forward direction of rotation. This engagement of tooth 36 with the ratchet wheel is shown particularly in FIG. 3 in which the operating lever is shown with shaft 26 at the inner end of the elongated slot 35. The elongated shape of slot 35 makes it possible for operating lever 33 to be shifted longitudinally of the lever within the slot in order to disengage tooth 36 from the ratchet wheel when the lever is rotated counterclockwise to engage another tooth 32 or to place the lever in the rest or inoperative position, as shown in FIGS. 1 and 2.

To hold the ratchet wheel 30 and drum 25 against reverse rotation when cable 15 is in tension, detent means such as holding pawl 40 is provided. Pawl 40 is pivotally mounted at 41 between sideplates 23 and 24 of the operator and is adapted to have a tooth-like portion 40a engage any of the ratchet teeth 32 in order to hold wheel 30 against reverse rotation. Pawl 40 is normally urged into ratchet engaging position by spring 43 which is held in compression between baseplate 22 and a rearwardly extending projection on pawl 40, as shown particularly in FIG. 3.

Cable 15 it attached at one end to drum 25 and at the other end, not shown in the drawing, to the brake linkage which may be of any conventional type and design. While the cable may be attached to drum 25 in some other manner if desired, it is preferred to use for this purpose outwardly extending projection 45 which serves the purpose of both connecting the end of the cable to the drum and as a stop means to limit reverse rotation of the drum, as will be described later. Projection 45 is provided with an internal bore 46 which receives the end of cable 15, the cable being held in the bore by some suitable means, for example set screws 47.

It will be noticed that projection 45 has at the end where cable 15 enters bore 46, an end face 48 which is preferably substantially normal to the axis of the cable as it enters bore 46. Although end face 48 is not necessarily exactly radial, it extends outwardly away from drum 25 and is accordingly referred to herein as being a generally radial face. The reason for this will become apparent.

As mentioned previously, cable 15 adjacent drum 25 is enclosed within a flexible cable housing 114. The length of this housing is not at all critical and while as a minimum it is long enough to extend between stationary frame 21 and bracket 17, the cable housing may, if desired, be extended rearwardly from bracket 17 any distance desired toward the connection of the cable to the brake linkage. The purpose of housing 18 is primarily to provide a stress-transmitting connection between frame 21 of the operator and the vehicle frame, thus relieving the cab pivot of any need to transmit stress. However, as a secondary matter, housing 14 is well adapted to protect the cable against wear, weathering, and other conditions which might be damaging. For the same reason, the major portion of the cable housing between operator frame 21 and bracket 17 is enclosed in a weaherproof sheath 18 in order to exclude water which might rust the cable housing or the cable and interfere with the smooth motion of one relative to the other.

Cable housing 14 is of well known construction in which a long strip of metal is wound into a spiral configuration with successive turns in contact with each other. However, the shape of the strip is such that the turns can slide somewhat relative to one another while maintaining contact, thus giving a considerable degree of flexibility to the housing while at the same time maintaining the housing essentially as a continuous member. The joint between successive turns of the spiral strip produces a spiral groove on the exterior of the housing, which corresponds generally to the spiral groove of a thread and advantage is taken of this to provide a connection between the cable housing and the operator frame.

The frame is provided with anchor means attached to it which serve as means for fastening or anchoring the end of cable housing 14 to the frame. This anchor means preferably takes the form of a pair of anchor blocks 50 and 51 which are formed integrally with the baseplate of the frame when the frame is made as a casting. While it may be satisfactory under some circumstances to provide only a single anchor block, it is preferred to provide the two anchor blocks as shown in order to provide greater versatility in installation and use for a single operator.

Each of anchor blocks 50 has an internal bore extending through the block. Each bore is provided with a spiral land 52 which conforms in size and pitch to the external groove on the cable housing. Thus when the cable housing is inserted in the bore, the land and the groove on the cable engage each other. In this way the cable housing and each anchor block are provided with inter-engaging screwthread means which hold the cable housing against linear axial movement with respect to the anchor block and yet which, upon rotation of the housing in the anchor block, permit such axial movement of the housing as may be required both for connection of cable to the anchor block and for adjustment for the end of the cable to position it relative to the drum, as will now be described.

As may be seen from examination of FIGS. 2 and 4, cable housing 14 extends from anchor block 50 towards drum 25, the anchor block being spaced from the drum. The cable housing normally projects into the path of projection 45 on the drum so that the end face 48 of the projection can engage the end of housing 14 as shown in FIG. 2 in order to limit the rotation of the drum in a reverse direction. It is obviously desirable to apply the impact of the stop member 47 in a direction substantially axial of housing 14. For this reason the axis of the bore in each of anchor blocks 50 and 51 is so located that it is substantially tangent to the axis of cable 15 at its attachment to drum 25. More precisely, each bore axis is designed to be tangent to the axis of the cable at its intersection with end face 48 in order that by cutting off the end of the cable squarely, that is normal to the housing axis, the face 48 engages over the entire end of the cable housing.

Under many circumstances it may be necessary to wrap the cable around the drum for more than one full turn commencing with the point of attachment at projection 45 in order to take up enough cable to provide the required tension in applying the brakes. Since the end of housing 14 normally projects into the path of drum projection 45, means are provided for deflecting the cable from this position in order to permit both forward revolution and initial reverse revolution of the drum. Such means is provided by the surface configuration of drum 25 and projection 45. It will be seen in FIG. 2, viewing the drum in end elevation, that the outer peripheral surface 54 of projection 45 fairs in a smooth curve into the circular portion of the drum of lesser diameter. Also the side surface 55 of projection 45 is inclined in an axial plane as shown in FIG. 4. These two surfaces in succession engage the cable housing upon revolution of the drum in a forward direction and deflect the cable housing laterally beyond the path of stop means furnished by projection 45 after the first full revolution of the drum. The usual action of the surfaces is to first engage the housing on peripheral surface 54 and subsequently with side surface 55, the result being to move the end of the cable housing laterally from the full line position shown in FIG. 4 to the dotted line position 14a of that figure. In the latter position, the housing is opposite the small diameter portion of the drum and one or more full turns of the cable may be wound upon this portion of the drum, depending upon the axial length of the drum.

In normal operation, the brakes are applied by oscillating the operating lever 33 through a short arc, such as indicated in FIG. 1 as the zone of ratchet action. During movement of the lever clockwise the ratchet wheel teeth are engaged and drum 25 is driven clockwise to wind cable 15 on the drum. During reverse movement, tooth 36 rides over the smooth peripheral faces of one or more teeth and engages another tooth, the ratchet being held during this period against reverse rotation by engagement of pawl tooth 40a with the ratchet wheel.

When it is desired to release the brakes, the operating handle is rotated counterclockwise to or near the release position indicated in FIG. 1, being at the same time moved longitudinally of the handle away from shaft 26, this latter movement being possible by the elongated shape of opening 35. In this latter position of the handle (FIGS. 1 and 2) cam surface 33a on the handle engages the lateral projection 49 on pawl 40, moving pawl 40 counterclockwise about pivot 41 out of engagement with the ratchet teeth. Drum 25 is now free to rotate in the reverse or counterclockwise direction under the force applied to it by the tension in cable 15.

Assuming that cable housing 14a is located relative to the drum as shown in FIG. 4, it will be appreciated that as the drum rotates in said reverse direction, the cable serves as guide means which, as the cable unwinds from the drum, moves the cable housing from position 14a into the path of stop means 45. As a consequence, the cable housing becomes so positioned that it engages end surface 48 of stop means 45, limiting the reverse rotation of the drum.

Contact between the cable housing and the drum stop preferably takes place when the parts are in approximately the position illustrated in FIG. 2 since in this position the cable axis approximates a straight line, and there is no bending of the strands of the cable when the drum stops roating. If the drum were allowed to rotate freely, it would over-travel considerably the position shown in FIG. 2 and would be stopped by the pull of the cable upon the continued travel of the drum, the result being a sharp bending of the cable where it emerges from face 48 of stop 45. This sharp bending is sufficient oftentimes to break the cable strands one by one, thus ultimately resulting in a significant weakening of the cable.

It is desirable to provide means for adjusting the position of the end of cable housing 14. The construction above described permits such adjustment to be accomplished by rotating the housing within the block 50 in order to increase or decrease as may be desired the length of the flexible cable projecting beyond anchor block 50 toward the drum. In general, it is desirable for the projecting length to be as short as possible in order to best resist the impact of the spinning drum; and this adjustment makes it possible to stop the drum at the most favorable position for not bending the cable. Of course the interengaging thread means on the anchor block and the cable also provide a means for so anchoring the cable to block 50 that the impact on the cable housing of the drum projection 45 is resisted and produces no substantial axial movement of the housing with respect to the anchor block.

Anchor block 51 is constructed in the same manner as block 50 and provides an alternate point for fastening the cable housing to operator frame 21. The two anchor blocks are located respectively on opposite sides of a vertical plane through shaft 26. Block 50 positions the cable housing so that the cable extends forwardly and downwardly from operator 10 as shown in a position to extend around the pivotal axis 60 of the cab. In the standard truck design not having a tilting cab it may be more convenient to run the cable and housing directly rearwardly from the operator. In this case the same cable housing is attached at block 51 instead of at block 50. Bracket 17 is now relocated rearwardly of the vehicle to a position 17a.

The operation of the device is the same in either case, the only difference being that the axis of cable housing 14 is horizontal when passing through anchor block 51, as indicated in the broken line positions 18a in FIGS. 1 and 2. Consequently, the cable drum now rotates beyond the position shown in FIG. 2 sufficiently to bring forward face 48 of the drum stop against the end of the cable, which now is approximately directly below shaft 26.

From the foregoing description of my novel form of cable tensioning device it will be apparent that various changes in the detailed construction and arrangement of the parts may be made by persons skilled in the art without departing from the spirit and scope of my invention. Accordingly, the foregoing description is considered to

7 be illustrative of, rather than limitative upon, the invention as defined by the appended claims.

I claim:
1. Cable tensioning mechanism, comprising:
   a stationary frame;
   a drum rotatably mounted on the frame;
   a cable attached at one end to the drum and wound around the drum;
   means to rotate the drum in a forward direction to wind a portion of the cable on the drum;
   releasable detent means engageable with the drum to prevent reverse rotation of the drum;
   a spiral wound flexible housing around the cable and terminating at one end at a position adjacent the drum;
   and cable anchor means including an internally threaded bore extending through a portion of the frame adjustably receiving the cable housing near said one end to connect the housing to the frame with the housing projecting a selected distance beyond the anchor means toward the drum, the distance being variable by rotating the cable housing in the threaded bore.
2. Cable tensioning mechanism as in claim 1 in which the drum includes stop means engageable with said one end of the cable housing when the cable is fully unwound from the drum to limit reverse rotation of the drum in response to cable pull thereon.
3. Cable tensioning mechanism as in claim 2 in which the stop means has a cam face engageable with the projecting end of the flexible cable housing to deflect the housing laterally upon forward rotation of the drum to wind more than one full turn of cable on the drum.
4. Cable tensioning mechanism, comprising:
   a stationary frame;
   a drum rotatably mounted on the frame;
   a cable attached at one end to the drum to be wound around the drum;
   means to rotate the drum in a forward direction to wind a portion of the cable on the drum;
   releasable detent means engageable with the drum to prevent reverse rotation of the drum;
   a flexible housing around the cable adjacent the drum;
   and anchor means on the frame for adjustably receiving the cable housing with the end thereof extending beyond the anchor means toward the drum, said anchor means comprising a block having a bore extending therethrough, said bore and housing having interengaging thread means producing axial movement of the housing relative to the block upon relative rotation of the cable housing;
   said drum including stop means having a generally radial face engageable with the projecting end of the cable housing to limit reverse rotation of drum and having a cam side face engageable with the projecting end of the housing to deflect the housing laterally beyond the stop means upon forward rotation of the drum to wind more than one full turn of cable on the drum.
5. Cable tensioning mechanism, comprising:
   a stationary frame;
   a drum rotatably mounted on the frame;
   a cable attached at one end to the drum to be wound around the drum;

8 means to rotate the drum in a forward direction to wind a portion of the cable on the drum;
   releasable detent means engageable with the drum to prevent reverse rotation of the drum;
   a flexible housing around the cable adjacent the drum;
   and anchor means on the frame for adjustably receiving the cable housing with the end thereof extending beyond the anchor means toward the drum, said anchor means comprising a pair of spaced blocks each having a bore therethrough, each said bore and the housing having interengageable thread means producing axial movement of the housing when in the bore and upon rotation of the cable housing;
   said drum including stop means having a generally radial face engageable with the projecting end of the cable when in either anchor block to limit reverse rotation of the drum and having a cam side face engageable with the projecting end of the housing when in either anchor block to deflect the housing laterally beyond the path of the stop means upon forward rotation of the drum to wind more than one full turn of cable on the drum.
6. A manual brake operator for brakes on a vehicle, comprising in combination:
   a stationary frame attached to the vehicle;
   a cable drum rotatably mounted on the frame and including outwardly projecting stop means;
   a cable wound on the drum and attached at one end to the drum and at the other end to the vehicle brakes;
   manually operable lever means pivoted on the frame for rotating the drum in a forward direction to wind the cable on the drum to apply the brakes;
   releasable detent means engageable with the drum to prevent reverse rotation of the drum when the cable is in tension;
   a spiral wound flexible housing around the cable adjacent the drum and fastened at one end to a fixed portion of the vehicle said housing terminating at the other end at a position adjacent the drum;
   and anchor means on the frame for fastening said other end of the cable to the frame in position for said other end of the cable housing to be engaged by said stop means when the cable is fully unwound from the drum to limit reverse rotation of the drum in response to cable tension.
7. A manual brake operator for brakes on a vehicle, as in claim 6, in which the cable is wound on the drum at a location axially offset from the projecting stop means and the cable engages the flexible housing to guide it into the path of the projecting stop means as the cable reaches the fully unwound position, whereby the stop means engages the end of the flexible housing.

References Cited by the Examiner
UNITED STATES PATENTS

| 1,912,678 | 6/1933 | Winning | 74—502 |
| 2,732,861 | 1/1956 | Gilmore | 74—501 |
| 3,016,759 | 1/1962 | Fletcher | 74—501 X |
| 3,077,790 | 2/1963 | Wolfe | 74—501 X |

FRED C. MATTERN, Jr., *Primary Examiner.*

W. S. RATLIFF, *Assistant Examiner.*